(12) United States Patent
Matsui et al.

(10) Patent No.: US 10,437,537 B2
(45) Date of Patent: Oct. 8, 2019

(54) DATA PROCESSING DEVICE AND NON-TRANSITORY COMPUTER READABLE MEDIUM

(71) Applicant: FUJI XEROX CO., LTD., Tokyo (JP)

(72) Inventors: Kenki Matsui, Yokohama (JP); Yuta Yamaguchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/257,358

(22) Filed: Sep. 6, 2016

(65) Prior Publication Data
US 2017/0286030 A1 Oct. 5, 2017

(30) Foreign Application Priority Data

Mar. 29, 2016 (JP) ................................ 2016-065295

(51) Int. Cl.
G06F 3/12 (2006.01)
G06K 15/02 (2006.01)
G06K 15/00 (2006.01)

(52) U.S. Cl.
CPC .......... *G06F 3/1254* (2013.01); *G06F 3/1204* (2013.01); *G06F 3/1205* (2013.01); *G06F 3/1238* (2013.01); *G06F 3/1285* (2013.01); *G06K 15/1809* (2013.01); *G06K 15/4095* (2013.01); *H04N 2201/0094* (2013.01)

(58) Field of Classification Search
CPC .................................................... G06F 3/1254
See application file for complete search history.

(56) References Cited

U.S. PATENT DOCUMENTS

| | | | | |
|---|---|---|---|---|
| 5,748,342 A | * | 5/1998 | Usami ................ | H04N 1/6011 358/500 |
| 2012/0087684 A1 | * | 4/2012 | Sasaki ................ | G03G 15/5062 399/53 |
| 2015/0055175 A1 | * | 2/2015 | Iida .................... | G06K 15/1823 358/1.15 |

FOREIGN PATENT DOCUMENTS

| JP | 2011-170561 A | 9/2011 |
|---|---|---|
| JP | 2015-150707 A | 8/2015 |

* cited by examiner

*Primary Examiner* — King Y Poon
*Assistant Examiner* — Michael Burleson
(74) *Attorney, Agent, or Firm* — Oliff PLC (57) ABSTRACT

A data processing device includes a feature specification unit that analyzes document data indicating a print target document to specify a feature of the print target document, an acquiring unit that acquires feature data indicating a feature of at least one document specified by analyzing each document and setting data indicating a print setting corresponding to each document, from a storage device, a selection unit that compares the specified feature of the print target document with the features indicated by the feature data of the documents acquired by the acquiring unit and that selects setting data used for printing of the print target document among the acquired setting data based on a comparison result, and a print instructing unit that instructs a printing device to print the print target document in accordance with the selected setting data.

6 Claims, 8 Drawing Sheets

| DOCUMENT TYPE | | PRINTING SETTING | MATCHING KEY | |
|---|---|---|---|---|
| TYPE | USE | | | |
| NEWSPAPER | DRAFT | 2up, DOUBLE SIDE, BLACK AND WHITE | TITLE, LAYOUT, SIZE, APPLICATION NAME, PDL DATA | ... |
| | LAYOUT CONFIRMATION | 1up, SINGLE SIDE, BLACK AND WHITE | TITLE, LAYOUT, SIZE, APPLICATION NAME, PDL DATA | ... |
| | FINAL CONFIRMATION | 1up, SINGLE SIDE, COLOR, HIGH IMAGE QUALITY | TITLE, LAYOUT, SIZE, APPLICATION NAME, PDL DATA | ... |
| PRESENTATION MATERIAL | RESUME | 2up, DOUBLE SIDE, COLOR, WITH NOTE | TITLE, LAYOUT, SIZE, APPLICATION NAME, PDL DATA | ... |
| | PRINT TO BE PRESENTED TO CUSTOMER | 1up, SINGLE SIDE, COLOR, HIGH QUALITY PAPER, HIGH IMAGE QUALITY | TITLE, LAYOUT, SIZE, APPLICATION NAME, PDL DATA | ... |
| | TROT | 4up, DOUBLE SIDE, BLACK AND WHITE | TITLE, LAYOUT, SIZE, APPLICATION NAME, PDL DATA | ... |
| ⋮ | ⋮ | ⋮ | ⋮ | |

| DOCUMENT TYPE | | PRINTING SETTING | MATCHING KEY |
|---|---|---|---|
| TYPE | USE | | |
| NEWSPAPER | DRAFT | 2up, DOUBLE SIDE, BLACK AND WHITE | TITLE, LAYOUT, SIZE, APPLICATION NAME, PDL DATA ... |
| | LAYOUT CONFIRMATION | 1up, SINGLE SIDE, BLACK AND WHITE | TITLE, LAYOUT, SIZE, APPLICATION NAME, PDL DATA ... |
| | FINAL CONFIRMATION | 1up, SINGLE SIDE, COLOR, HIGH IMAGE QUALITY | TITLE, LAYOUT, SIZE, APPLICATION NAME, PDL DATA ... |
| PRESENTATION MATERIAL | RESUME | 2up, DOUBLE SIDE, COLOR, WITH NOTE | TITLE, LAYOUT, SIZE, APPLICATION NAME, PDL DATA ... |
| | PRINT TO BE PRESENTED TO CUSTOMER | 1up, SINGLE SIDE, COLOR, HIGH QUALITY PAPER, HIGH IMAGE QUALITY | TITLE, LAYOUT, SIZE, APPLICATION NAME, PDL DATA ... |
| | TROT | 4up, DOUBLE SIDE, BLACK AND WHITE | TITLE, LAYOUT, SIZE, APPLICATION NAME, PDL DATA ... |
| ⋮ | ⋮ | ⋮ | ⋮ |

FIG. 8

| FEATURE TYPE | POINT |
|---|---|
| TITLE | 3 |
| # up | 5 |
| DOUBLE SIDE/SINGLE SIDE | 7 |
| BLACK AND WHITE/COLOR | 8 |
| ⋮ | ⋮ |

| SETTING ITEM | SETTING VALUE |
|---|---|
| BLACK AND WHITE/COLOR | COLOR |
| SHEET TRAY | TRAY 5 |
| ⋮ | ⋮ |

FIG. 12

| NOTIFICATION CONDITION |
|---|
| MISSING OF LETTER |
| RATE OF INCREASE IN THE NUMBER OF PAGES>20% |
| ⋮ |

FIG. 13

| USER ID | PROHIBITION SETTING CONTENTS |
|---|---|
| ABC | COLOR |
| XYZ | COLOR, SINGLE SIDE |
| ⋮ | ⋮ |

FIG. 14

| SETTING CONTENTS | REPLACEMENT SETTING CONTENTS |
|---|---|
| COLOR | BLACK AND WHITE |
| DOUBLE SIDE | SINGLE SIDE |
| ⋮ | ⋮ |

US 10,437,537 B2

DATA PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-065295 filed on Mar. 29, 2016.

BACKGROUND

Technical Field

The present invention relates to a data processing device and a non-transitory computer readable medium.

SUMMARY

According to an aspect of the invention, there is provided a data processing device including a feature specification unit that analyzes document data indicating a print target document to specify a feature of the print target document; an acquiring unit that acquires, from a storage device, feature data indicating a feature of at least one document which is specified by analyzing the at least one document and setting data indicating a print setting corresponding to the at least one document; a selection unit that compares the feature of the print target document which is specified by the feature specification unit with the feature indicated by the feature data of the at least one document which is acquired by the acquiring unit and that selects setting data used for printing of the print target document among the setting data acquired by the acquiring unit based on a comparison result; and a print instructing unit that instructs a printing device to print the print target document in accordance with the setting data selected by the selection unit.

BRIEF DESCRIPTION OF THE DRAWINGS

Exemplary embodiments of the present invention will be described in detail based on the following figures, wherein.

DETAILED DESCRIPTION

[1] Configuration

Figure 1:
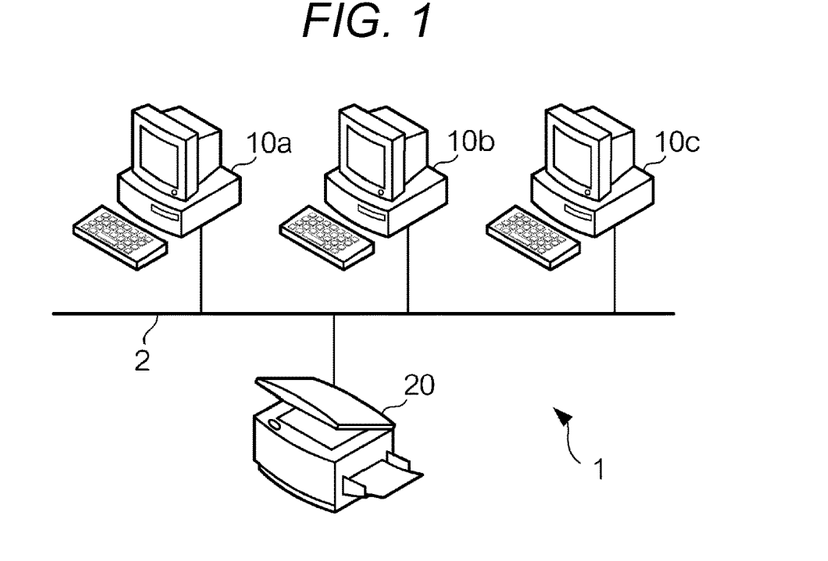
FIG. 1 is a schematic diagram showing a configuration of a system according to an exemplary embodiment.

FIG. 1 is a schematic diagram showing a configuration of a system 1 according to this exemplary embodiment. The system 1 includes client devices 10a, 10b, and 10c and an image forming apparatus 20. The client devices 10a, 10b, and 10c are, for example, personal computers operated by users. The client devices are referred to as a "client device 10" in a case where it is not necessary to distinguish the client devices 10a, 10b, and 10c from each other.

The image forming apparatus 20 is an apparatus that provides services, such as copying, scanning, and printing, to a user. For this reason, the image forming apparatus 20 performs processes such as an image forming process (printing process) of forming an image on a medium and an image reading process of reading an image formed on a medium. The image forming apparatus 20 is shared by plural users. For this reason, an account is created for each user of the image forming apparatus 20, and user authentication is performed based on information of the account.

The communication line 2 is, for example, the Internet, a mobile communication network, a telephone line, or the like. The client device 10 and the image forming apparatus 20 are connected to the communication line 2.

Figure 2:
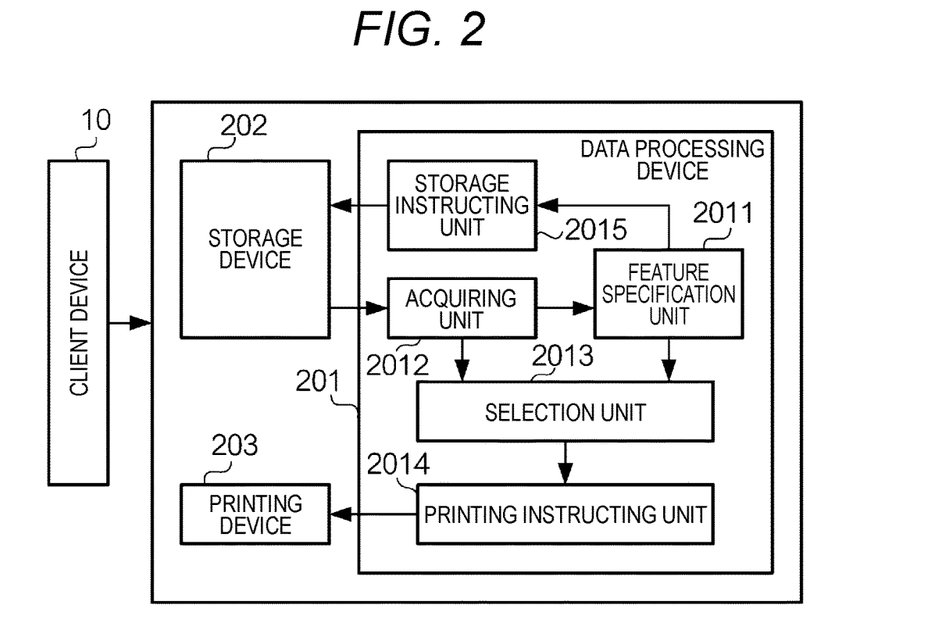
FIG. 2 is a diagram showing an example of a functional configuration of an image forming apparatus according to the exemplary embodiment.

FIG. 2 is a diagram showing an example of a functional configuration of the image forming apparatus 20. The image forming apparatus 20 includes a data processing device 201, a storage device 202, and a printing device 203.

The data processing device 201 includes a feature specification unit 2011, an acquiring unit 2012, a selection unit 2013, a print instructing unit 2014, and a storage instructing unit 2015.

The feature specification unit 2011 analyzes document data which is input to specify features of a document indicated by the document data. The acquiring unit 2012 acquires plural sets of feature data and setting data that are stored in the storage device 202.

The feature data is data indicating features of a template document specified by analyzing document data indicating a document (hereinafter, referred to as a "template document") which serves as a template by the feature specification unit 2011. The setting data is data indicating a print setting designated by a user with respect to the template document. For each of one or more template documents, the storage device 202 stores feature data and setting data in association with each other. The acquiring unit 2012 reads and acquires the sets of feature data and setting data from the storage device 202.

The selection unit 2013 compares features of a print target document which are specified by analyzing document data indicating a document, which is designated as an object to be printed by a user (hereinafter, referred to as a "print target document"), by the feature specification unit 2011 with features indicated by the feature data acquired by the acquiring unit 2012, and selects setting data which is used for the printing of the print target document among pieces of setting data acquired by the acquiring unit 2012 based on the comparison results. The print instructing unit 2014 instructs the printing device 203 to print the print target document in accordance with the setting data selected by the selection unit 2013. However, in a case where a user's instruction for changing a print setting, indicated by the setting data selected by the selection unit 2013, is given, the print instructing unit 2014 changes the setting data in accordance with the instruction for change, and instructs the printing device 203 to print the print target document in accordance with the changed setting data.

The storage instructing unit 2015 instructs the storage device 202 to store feature data indicating features of a template document which are specified by analyzing document data indicating the template document designated by a user by the feature specification unit 2011, and setting data indicating a print setting, designated by the user in accordance with the template document, in association with each other.

Figure 3:
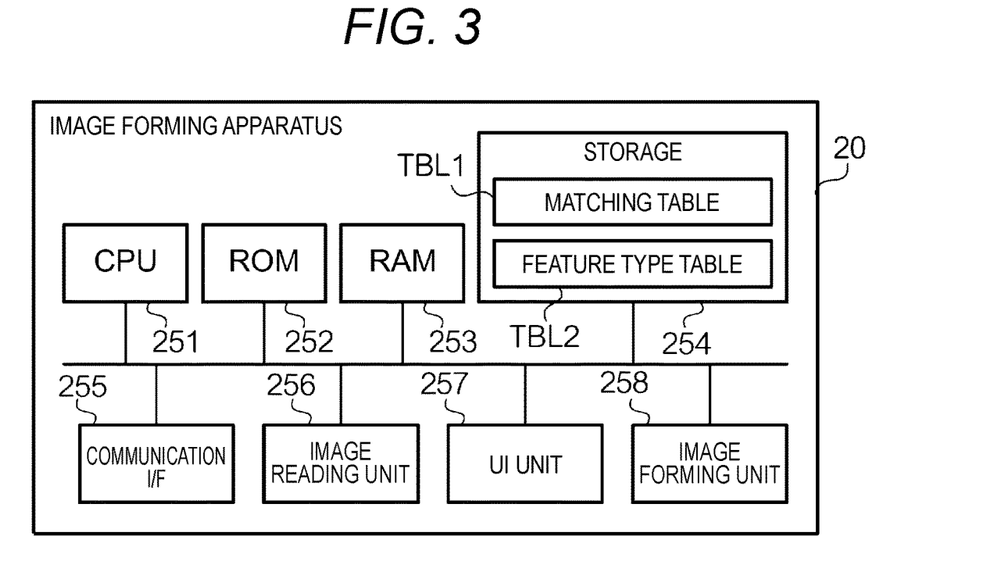
FIG. 3 is a diagram showing a hardware configuration of the image forming apparatus according to the exemplary embodiment.

FIG. 3 is a diagram showing a hardware configuration of the image forming apparatus 20. The image forming apparatus 20 includes a central processing unit (CPU) 251, a read only memory (ROM) 252, a random access memory (RAM) 253, a storage 254, a communication I/F 255, an image reading unit 256, a UI unit 257, and an image forming unit 258. The CPU 251 is a control device (processor) that controls each unit of the image forming apparatus 20. ROM 252 is a nonvolatile storage device that stores programs and data. The RAM 253 is a volatile main storage device that functions as a work area when the CPU 251 executes a program. The storage 254 is a nonvolatile auxiliary storage device that stores programs and data. The storage 254 stores a matching table TBL1 that stores a set of the above-mentioned feature data and setting data, and a feature type table TBL2 that stores feature type data indicating types of features of a document. The communication I/F 255 is an interface for performing communication through the communication line 2.

The image reading unit 256 performs an image reading process of reading an image drawn on an original document using, for example, a charge coupled device (CCD) system. The UI unit 257 includes, for example, a touch screen and keys, and accepts a user's operation. The image forming unit 258 forms an image based on image data on a medium such as a sheet using, for example, an electrophotographic system. The image forming unit 258 is an example of the printing device 203. Meanwhile, the above-mentioned systems used for the reading and forming of an image are examples, and other systems may be used.

In this example, the CPU 251 executes programs stored in the storage 254, and thus the functions shown in FIG. 2 are realized. The CPU 251 executing the programs is an example of each of the feature specification unit 2011, the acquiring unit 2012, the selection unit 2013, the print instructing unit 2014, and the storage instructing unit 2015. The storage 254 is an example of the storage device 202.

Figure 4:
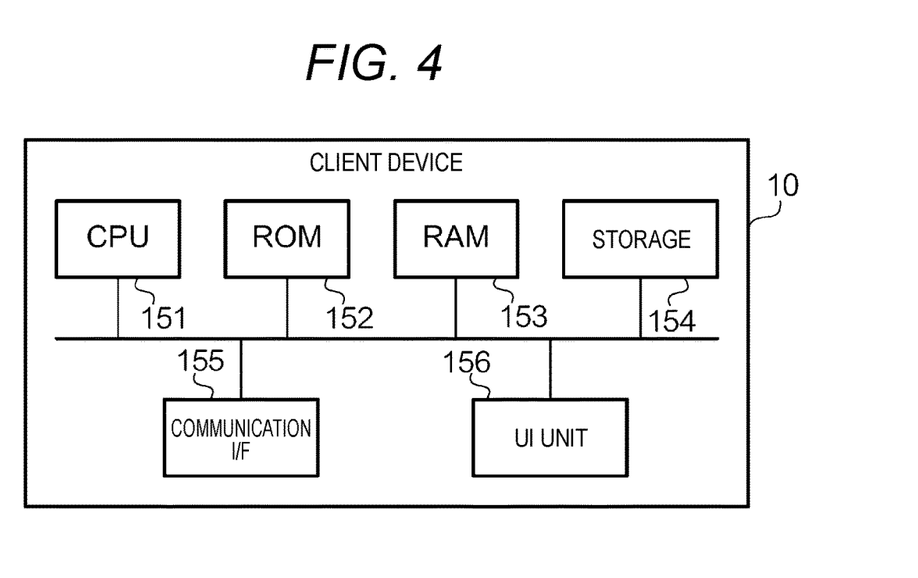
FIG. 4 is a diagram showing a hardware configuration of a client device according to the exemplary embodiment.

FIG. 4 is a diagram showing a hardware configuration of the client device 10. The client device 10 includes a CPU 151, a ROM 152, a RAM 153, a storage 154, a communication I/F 155, and a UI unit 156. The CPU 151 is a control device (processor) that controls each unit of the client device 10. The ROM 152 is a nonvolatile storage device that stores programs and data. The RAM 153 is a volatile main storage device that functions as a work area when the CPU 151 executes a program. The storage 154 is a nonvolatile auxiliary storage device that stores programs and data. The communication I/F 155 is an interface for performing communication through the communication line 2. The UI unit 156 includes, for example, a touch screen and keys, and accepts a user's operation.

[2] Operations

In this exemplary embodiment, the CPU 251 of the image forming apparatus 20 analyzes document data indicating a print target document designated by a user, specifies features of the print target document, and compares features of template documents respectively indicated by one or more pieces of feature data that are stored in the matching table TBL1 in advance, to thereby select setting data indicating a print setting which is appropriate for the print target document. In the following description, first, the operation of the system 1 which is associated with the registration of feature data and setting data of a template document with respect to the matching table TBL1 will be described. Subsequently, the operation of the system 1 which is associated with the printing of a print target document designated by a user will be described.

[2-1] Registration Operation

In a case where a user registers a print setting of a template document, the user designates a template document, a print setting, and a type of template document using the UI unit 156 of the client device 10. The client device 101 outputs document data indicating a template document designated by a user, setting data indicating a print setting designated by a user, and document type data indicating the type of template document which is designated by a user to the image forming apparatus 20.

The document data is data which is described in, for example, a page description language (PDL). The print setting is a combination of various settings related to printing processes such as "double side" (indicating double-side printing), "2up" (indicating printing of two pages on one sheet), "black and white" (indicating black-and-white printing), "color" (indicating color printing), "single side" (indicating single-side printing), and "double side" (indicating double-side printing).

In this exemplary embodiment, the type of template document includes a combination of a type and a use. The wording "type of template document" as used herein refers to, for example, a "newspaper", "presentation material", "minutes", or the like. The wording "use of a template document" as used herein refers to a "draft", "layout confirmation", "final confirmation", or the like. Meanwhile, the type and the use is expedient classification which is used when a user distinguishes template documents from each other, and can be freely set by a user.

Figure 5:
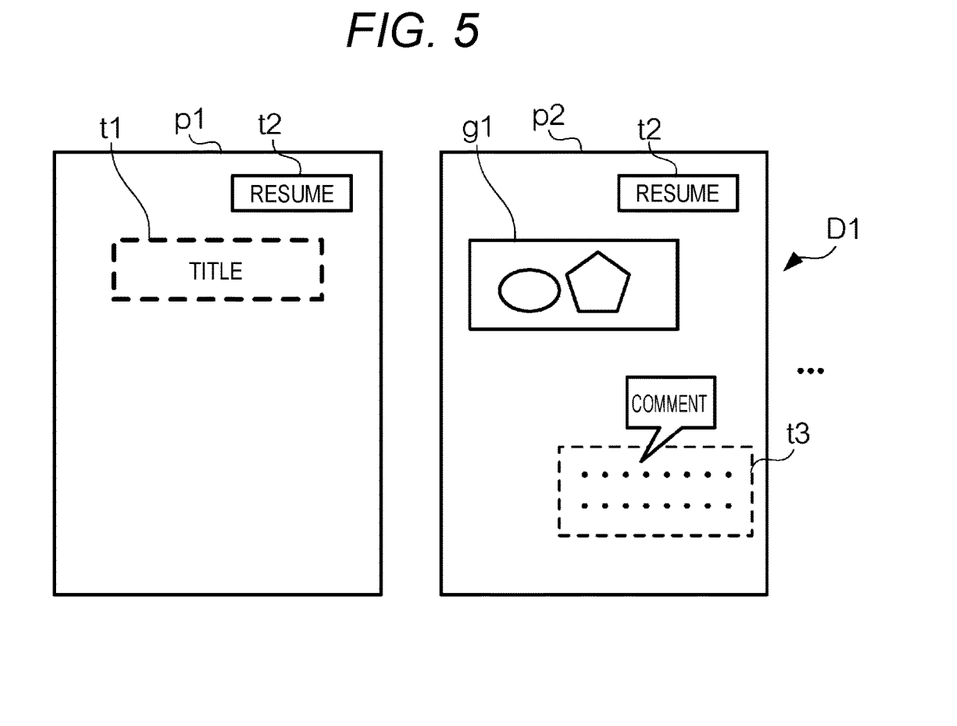
FIG. 5 is a schematic diagram showing contents of a document indicated by document data according to the exemplary embodiment.

FIG. 5 is a schematic diagram showing contents of a document indicated by document data D1 which is an example of document data. The document data D1 includes plural pages of a page p1, a page p2, . . . . In the document data D1, plural components such as a character string t1 indicating the title of the document, a character string t2 indicating the use of the document, other character strings t3, and an image g1 indicating a photo, a graph, or the like are laid out.

Figure 6:
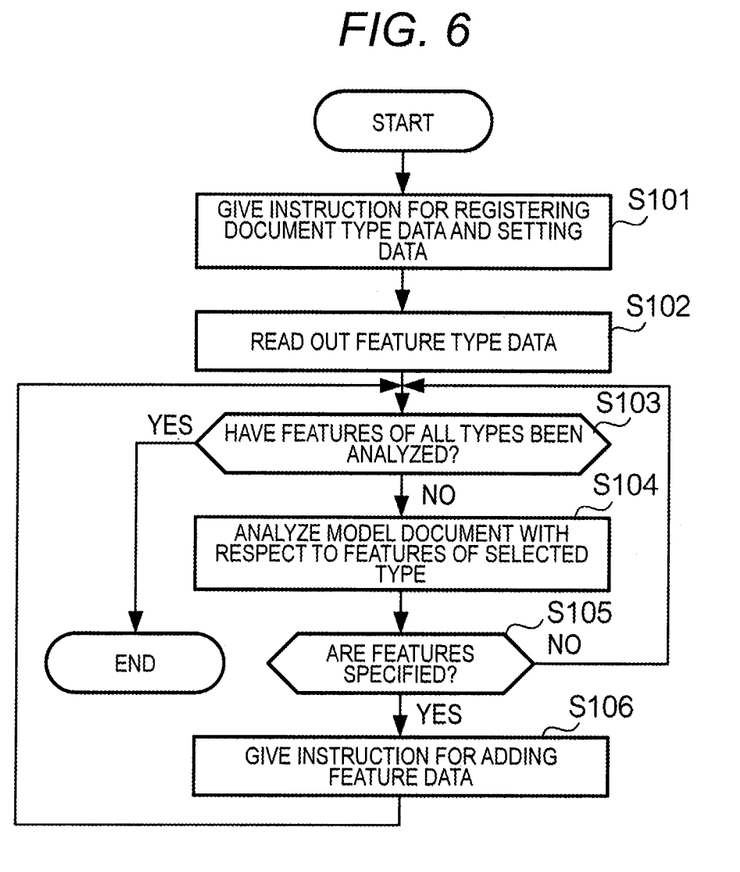
FIG. 6 is a flowchart showing a flow of a process performed by a data processing device according to the exemplary embodiment.

FIG. 6 is a flowchart showing a flow of a process performed by the data processing device 201 in a case where a template document, a print setting, a type of template document are designated by a user. First, the storage instructing unit 2015 instructs the storage device 202 to register document type data indicating a type of a document which is input from the client device 10 and setting data indicating a print setting in the matching table TBL1 (step S101).

Figure 7:
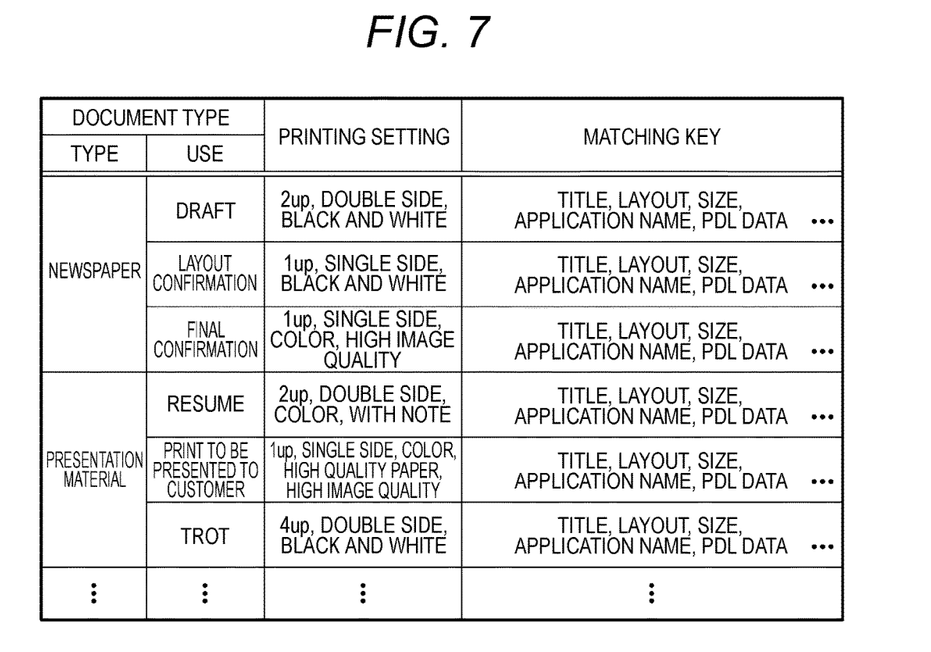
FIG. 7 is a diagram showing contents of a matching table according to the exemplary embodiment.

FIG. 7 is a diagram showing contents of the matching table TBL1 stored in the storage device 202. The matching table TBL1 is a collection of records corresponding to respective template documents, and includes fields of "document type", "print setting", and "matching key". The field of "document type" includes subfields of "type" and "use". The field of "document type" stores document type data which is input from the client device 10. The field of "print setting" stores setting data indicating a print setting designated by a user.

The field of "matching key" stores feature data indicating features of a template document which are obtained by analyzing and specifying document data indicating the template document, input from the client device 10, by the feature specification unit 2011. The feature data stored in the field of "matching key" is used as a standard for specifying similarity between a print target document and each of one or more template documents when the selection unit 2013 selects setting data. Properties of various types of documents can be used as features of a document which are indicated by feature data. Examples thereof include a title, a layout, a size, a name of an application program used for the generation of a document, a document name (a file name of document data), a font size, a name of a person who creates a file, the date and time of creation of a file and the like. A feature type table TBL2 storing feature type data indicating types of features is stored in the storage device 202 in advance.

Figure 8:
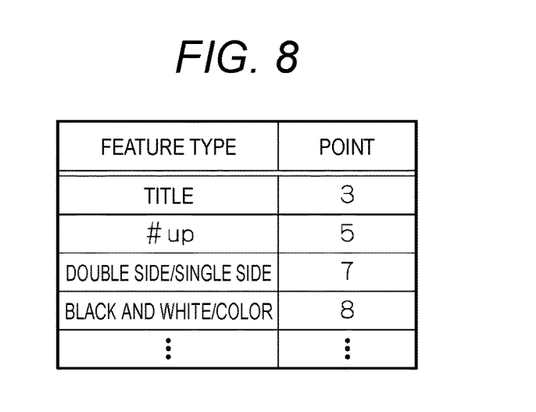
FIG. 8 is a diagram showing contents of a feature type table according to the exemplary embodiment.

FIG. 8 is a diagram showing contents of the feature type table TBL2 stored in the storage device 202. The feature type table TBL2 is a collection of records corresponding to respective feature types, and includes fields of [feature type] and [point]. The field of [feature type] stores feature type data. In a case where features of types indicated by pieces of feature type data are consistent with each other in comparison between features of a template document and a print target document which are obtained by the feature specification unit 2011, the field of [point] stores numerical values (points) determined in accordance with the magnitude of influence of the consistent features on similarity between the documents.

A description of the process performed by the data processing device 201 will be continued with reference to FIG. 6. When the process of step S101 is completed, the feature specification unit 2011 analyzes document data indicating a template document which is input from the client device 10, and performs a series of processes for specifying features of the template document.

First, the acquiring unit 2012 reads out all pieces of feature type data stored in the field of [feature type] of the feature type table TBL2 stored in the storage device 202 (step S102). Subsequently, the feature specification unit 2011 determines whether or not the analysis of a template document has been completed with respect to features of all of the types indicated by the pieces of feature type data read out from the feature type table TBL2 (step S103). Since there is generally one or more types of features having not been subjected to analysis immediately after the analysis of a template document is started, the feature specification unit 2011 determines in step S103 that the analysis of a template document has not yet been completed with respect to the features of all of the types (step S103; N). The feature specification unit 2011 selects any one type having not yet been subjected to analysis among the types of the features indicated by the pieces of feature type data, and analyzes a template document with respect to features of the selected type (step S104).

In a case where features of the type selected in the analysis performed in step S104 are specified (step S105; Y), the storage instructing unit 2015 instructs the storage device 202 to add data indicating the features specified by the feature specification unit 2011 to a field of [matching key] of the matching table TBL1 as feature data corresponding to the document type data and the setting data for which the storage instruction is given in step S101 (step S106).

In a case where features of the type selected in the analysis performed in step S104 are not specified (step S105; N), the data processing device 201 repeats the process of step S103 and the subsequent processes without making the storage instructing unit 2015 give an instruction for adding feature data. In addition, the data processing device 201 repeats the process of step S103 and the subsequent processes even after the process of step S106 is completed.

In a case where the analysis of a template document has been completed with respect to features of all of the types (step S103; Y), the data processing device 201 terminates a series of processes. Pieces of feature data indicating features of a template document designated by a user are registered in the matching table TBL1 of the storage device 202 in association with setting data indicating a print setting designated by the user through the above-mentioned series of processes.

Hereinafter, a method of analyzing a template document by the feature specification unit 2011 in step S104 will be described. For example, the type of the feature which is selected in step S104 is a name of an application program used for the creation of a document, the feature specification unit 2011 searches for the corresponding data from a header of document data indicating a template document. In addition, for example, in a case where the selected type of the feature is a layout of a document, the feature specification unit 2011 specifies a layout of a document indicated by document data and classifies the specified layout into the most appropriate category among predetermined plural categories.

In a case where the selected type of the feature is a title, the feature specification unit 2011 specifies a portion of a title included in a document based on a layout, a font size, and the like of the document indicated by document data. For example, in a case where contents of a template document are as shown in FIG. 5, it is symbolized that the feature specification unit 2011 specifies, as a title, a character string t1 which is located in the center of a head portion of a document in a horizontal direction and which has a font size larger than that in the vicinity thereof. The feature specification unit 2011 extracts a keyword included in the specified title.

In a case where the selected type of the feature is a font size, the feature specification unit 2011 specifies, for example, a distribution pattern of the font size.

In a case where the selected type of the feature is a file name, the feature specification unit 2011 searches for the corresponding data from the header of the document data and extracts a keyword included in the specified file name.

[2-2] Printing Operation

In a case where a user desires to print a print target document, the user designates the print target document using the UI unit 156 of the client device 10 and gives an instruction for printing. The client device 10 outputs document data indicating the print target document designated by the user and setting data indicating a default print setting to the image forming apparatus 20.

Figure 9:
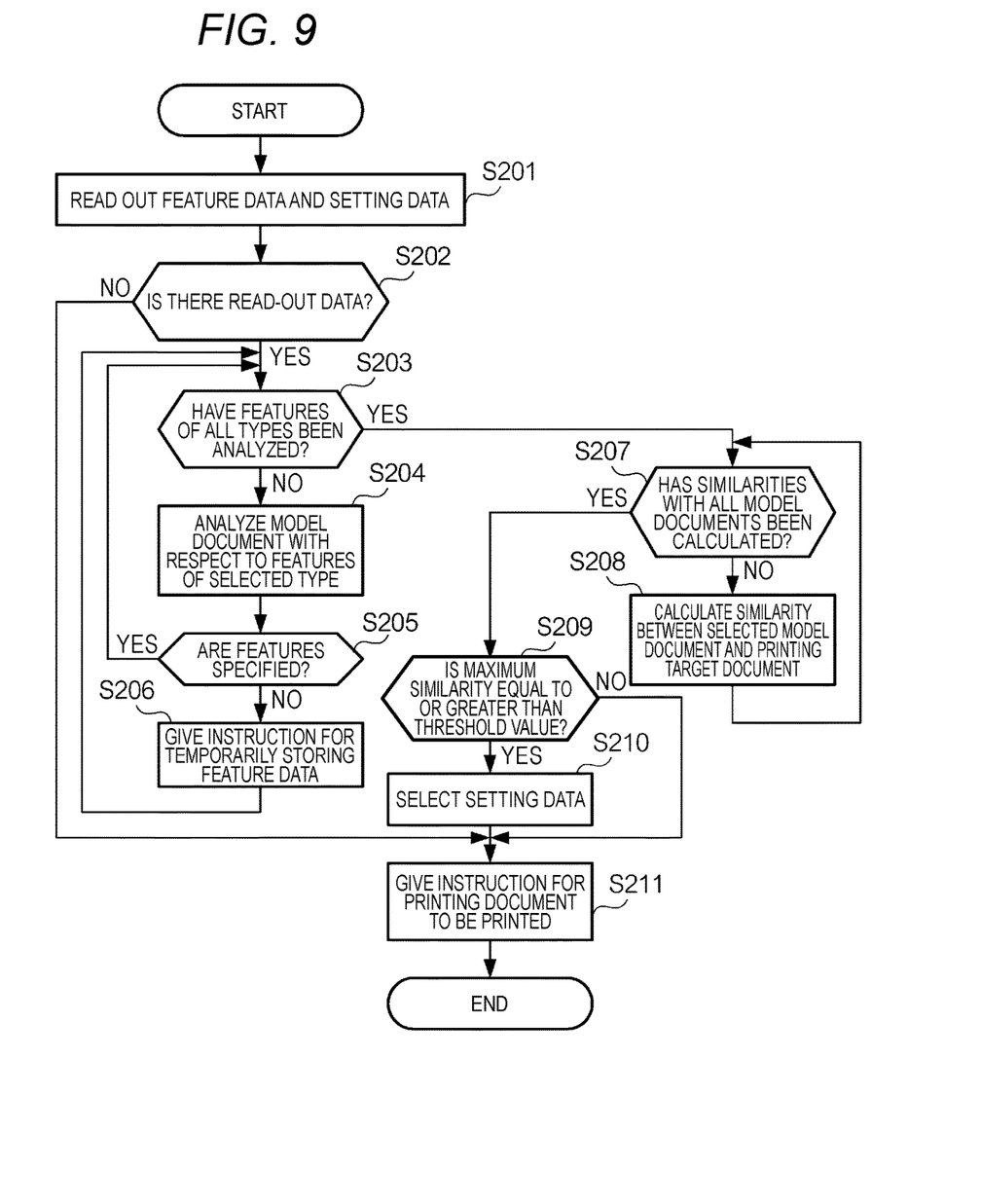
FIG. 9 is a flowchart showing a flow of a process performed by the data processing device according to the exemplary embodiment.

FIG. 9 is a flowchart showing a flow of a process performed by the data processing device 201 in a case where a user gives an instruction for a print target document. First, the acquiring unit 2012 reads out sets of pieces of setting data stored in fields of [print setting] of all records registered in the matching table TBL1 and pieces of feature data stored in fields of [matching key], from the storage device 202 (step S201).

In the process of step S201, in a case where no record is registered in the matching table TBL1 and any set of setting data and feature data is thus not read out (step S202; N), the print instructing unit 2014 instructs the printing device 203 to print a print target document in accordance with a default print setting indicated by setting data which is input from the client device 10 together with document data (step S211).

Normally, one or more records are registered in the matching table TBL1 (step S202; Y). In this case, the feature specification unit 2011 analyzes document data indicating a print target document and specifies features of the print target document (steps S203 to S205), and the storage instructing unit 2015 makes the storage device 202 store feature data indicating the features specified by the feature specification unit 2011 (step S206).

The process of specifying features of a print target document which is performed by the feature specification unit 2011 in steps S203 to S205 is the same as the process of specifying features of a template document which is performed by the feature specification unit 2011 in steps S103 to S105 of FIG. 6. In addition, the process of making the storage device 202 store feature data which is performed by the storage instructing unit 2015 in step S206 corresponds to the process of making the storage device 202 store feature data indicating features of a template document which is performed by the storage instructing unit 2015 in step S106 of FIG. 6. However, in step S206, the feature data of the print target document is temporarily stored until the specification of similarity (which will be described below) is completed, rather than being registered in the matching table TBL1.

Subsequently, the selection unit 2013 determines whether or not the calculation of similarity (which will be described below) using feature data has been completed with respect to all of the one or more pieces of feature data (indicating features of a template document) which are read out from the matching table TBL1 (step S207). The pieces of feature data read out from the matching table TBL1 include feature data that has not been yet used for the calculation of similarity at a point in time when the calculation of similarity is started by the selection unit 2013, and thus the selection unit 2013 determines in step S207 that the calculation of similarity using feature data has not been yet completed with respect to all of the pieces of feature data of the template document (step S207; N). The selection unit 2013 selects feature data that has not been yet used for the calculation of similarity among the pieces of feature data read out from the matching table TBL1, and calculates similarity between a feature of the template document which is indicated by the selected feature data and the feature of the print target document which is temporarily stored in the storage device 202 in step S206 (step S208).

The selection unit 2013 sequentially reads out the pieces of feature type data stored in the feature type table TBL2 stored in the storage device 202 in step S208, and determines whether or not a feature of a template document and a feature of a print target document are consistent with each other with respect to types of features of the read-out pieces of feature type data. When the features are consistent with each other, numerical values stored in the fields of [point] of the records of the feature type table TBL2 depending on the types of the features are sequentially added to a numerical value indicating similarity between a template document and a print target document. The selection unit 2013 determines whether or not features are consistent with each other with respect to types of features indicated by all pieces of feature type data stored in the feature type table TBL2 and adds up points based on the determination results, to thereby calculate similarity between a template document and a print target document. Similarity data indicating the similarity calculated by the selection unit 2013 is temporarily stored in the storage device 202 together with setting data of a record which is the same as feature data of a template document used for the calculation of similarity.

Subsequently, the data processing device 201 returns the process to step S207, and repeats the calculation of similarity using feature data of a template document which has not been yet used. When the calculation of similarity between a template document and a print target document using feature data is completed with respect to all of the pieces of feature data read out from the matching table TBL1 (step S207; Y), the selection unit 2013 determines whether or not a maximum value of the similarities indicated by pieces of similarity data which respectively correspond to one or more pieces of template documents and which are temporarily stored in the storage device 202 is equal to or greater than a predetermined threshold value (step S209).

In the determination of step S209, in a case where the maximum value of the similarities has not reached the threshold value (step S209; N), the print instructing unit 2014 instructs the printing device 203 to print a print target document in accordance with a default print setting indicated by setting data which is input from the client device 10 together with document data (step S211).

On the other hand, in the determination of step S209, in a case where the maximum value of the similarities is equal to or greater than the threshold value (step S209; Y), the selection unit 2013 selects setting data temporarily stored in the storage device 202 together with the similarity data indicating the maximum value, as setting data used for the printing of a print target document, and substitutes the selected setting data for setting data which is input from the client device 10 together with document data (step SS210). Thereafter, the print instructing unit 2014 instructs the printing device 203 to print a print target document in accordance with a print setting indicated by the replaced setting data, that is, a print setting of a template document which has the highest similarity in feature with respect to a print target document (step S211).

When the printing device 203 receives an instruction from the print instructing unit 2014 in step S211, the printing device prints a print target document in accordance with the instruction. As a result, when the print target document has features similar to those of any of template documents registered in advance by a user, the print target document is printed in accordance with a print setting of the template document having similar features. Accordingly, the user does not need to perform a print setting each time a document is printed.

Modification Example

The above-described embodiment is just an example for implementing the invention, and can be modified in various ways. The modification examples thereof will be described below. Meanwhile, two or more of the above-described embodiment and the plural modification examples to be described later may be combined with each other when necessary.

(1) In the system 1, the print setting of a template document having features similar to those of a print target document is applied in the printing of the print target document. Before printing is performed based on a specific setting item and setting value being adopted due to a reason, such as the incurrence of costs like color printing or printing using a sheet from a sheet tray having high-quality sheets charged therein, among print settings, a user may desire to know the execution of the printing. Accordingly, the system 1 may be configured so that a notice is given to a user before the print instructing unit 2014 gives an instruction for printing to the printing device 203 in step S211 in a case where the setting data selected by the selection unit 2013 in step S210 of FIG. 9 indicates any of the specific setting item and setting value.

Figure 10:
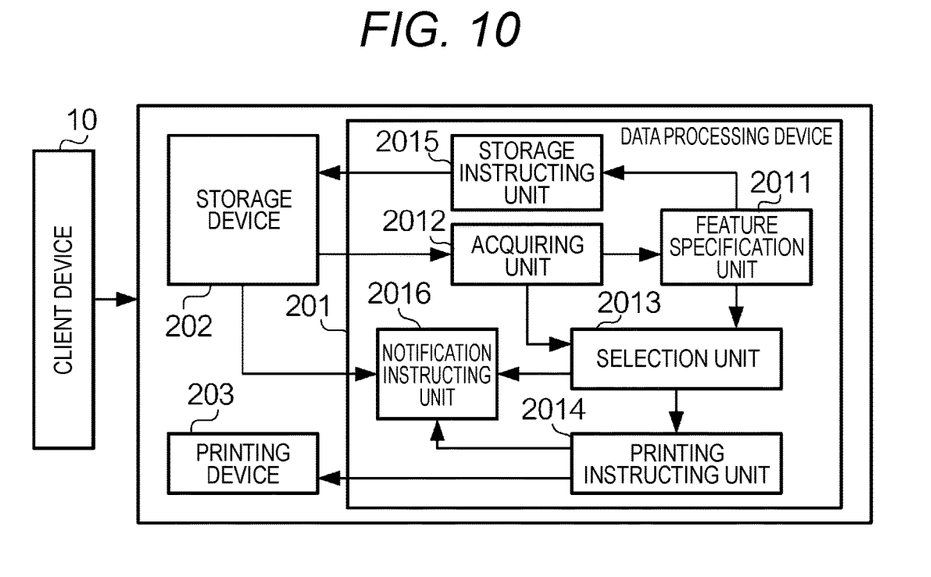
FIG. 10 is a diagram showing an example of a functional configuration of an image forming apparatus according to a modification example.

FIG. 10 is a diagram showing an example of a functional configuration of the image forming apparatus 20 according to this modification example. In this modification example, the image forming apparatus 20 includes a notification instructing unit 2016 in addition to all of the functional components included in the image forming apparatus 20 according to the above-described embodiment. The notification instructing unit 2016 is realized by the CPU 251. The notification instructing unit 2016 instructs the client device 10 (an example of a notification device) to give a notice to a user in a case where a print setting indicated by setting data selected by the selection unit 2013 satisfies predetermined conditions.

Figure 11:
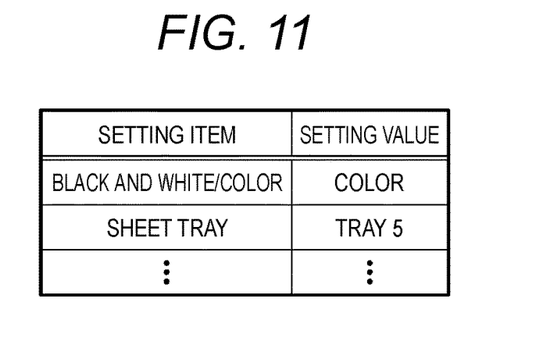
FIG. 11 is a diagram showing contents of a notification condition table according to the modification example.

FIG. 11 is a diagram showing contents of a notification condition table TBL3 stored in the storage device 202 according to this modification example. The notification condition table TBL3 is a collection of records corresponding to respective contents of print settings which have to be notified to a user before the execution of printing, and includes fields of [setting item] and [setting value]. A case where the value of a setting item shown in the field of [setting item] is a setting value shown in the field of [setting value] means that a notice indicating that printing is performed based on the setting contents has to be given to a user.

Meanwhile, the field of [setting value] may show plural setting values or a range of a setting value. In addition, in the example shown in FIG. 11, one record is designated with a setting value with respect to one setting item as a condition of notification, but a combination of setting values with respect to two or more setting items may be designated as a condition of notification.

In a case where a print setting indicated by setting data selected by the selection unit 2013 includes setting contents satisfying a condition indicated by any record of the notification condition table TBL3, the notification instructing unit 2016 generates notification data indicating the setting contents and transmits the generated data to the client device 10 which is a request source of printing of a print target document. The client device 10 displays a notice such as "Color printing is performed. Is it alright? (Yes/No)" on the UI unit 156 in accordance with notification data transmitted from the image forming apparatus 20.

According to this modification example, in a case where a user attempts to perform printing based on specific setting contents, the user can confirm the execution of the printing in advance. In a case where the printing is inappropriate, the user can cancel the printing or can change a print setting.

(2) A print setting may include setting contents for instructing a document different from an original document by making a change to the original document indicated by document data. For example, in a case where print setting includes "capital letter printing" for printing a letter having a font size smaller than a predetermined font size in a large size, a letter in a document to be printed is printed in a font size larger than that of the original document.

In a case where a document to be printed is different from the original document as in the above-mentioned "capital letter printing", a user's undesirable printing may be performed, for example, a part of contents is not printed or the number of sheets of a document to be printed increases. For example, in a case where the above-mentioned capital letter printing is performed, some of letters within a frame having a fixed size may not be printed. In addition, a letter in a region having a variable size may be printed on a page which is not an original page.

Accordingly, the system 1 may be configured so that a notice is given to a user before the print instructing unit 2014 gives an instruction for printing to the printing device 203 in step S211 in a case where a print target document printed in accordance with the setting data selected by the selection unit 2013 in step S210 of FIG. 9 is substantially different from the original print target document indicated by document data.

A functional configuration of the image forming apparatus 20 according to this modification example is the same as the functional configuration shown in FIG. 10 according to the above-described modification example (1). In this modification example, the notification instructing unit 2016 instructs the client device 10 (an example of a notification device) to give a notice to a user in a case where a difference between a print target document printed in accordance with setting data selected by the selection unit 2013 and a print target document indicated by document data satisfies predetermined conditions.

Figure 12:
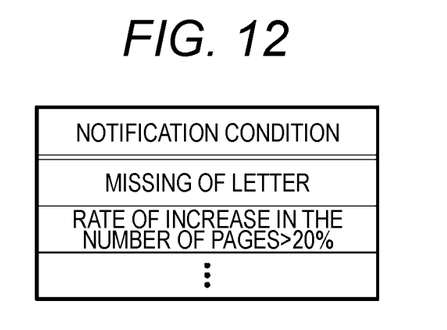
FIG. 12 is a diagram showing contents of a notification condition list according to the modification example.

FIG. 12 is a diagram showing contents of a notification condition list LST1 stored in the storage device 202 according to this modification example. The notification condition list LST1 is a collection of pieces of data indicating conditions for a difference that has to be notified to a user before the execution of printing, among differences between an original document and a document to be printed.

The notification instructing unit 2016 includes, for example, a virtual printer, and generates image data of a print target document which is to be printed in accordance with setting data selected by the selection unit 2013. Subsequently, the notification instructing unit 2016 determines whether or not a difference between a print target document indicated by the generated image data and the original print target document indicated by document data satisfies conditions indicated by data included in the notification condition list LST1, and generates notification data indicating the difference in a case where there is a difference satisfying the conditions. The notification instructing unit 2016 transmits the generated notification data to the client device 10 which is a request source of printing of a print target document. The client device 10 displays a notice such as "Some letters are missing. Is it alright? (Yes/No)" on the UI unit 156 in accordance with notification data transmitted from the image forming apparatus 20.

According to this modification example, in a case where a document to be printed is substantially different from the original document, a user can confirm the execution of the printing in advance. In a case where the printing is inappropriate, the user can cancel the printing or can change a print setting.

(3) In the above-described modification example (1) or (2), in a case where a print setting indicated by setting data selected by the selection unit 2013 is inappropriate, a user can change the print setting. In a case where a user's instruction for changing a print setting indicated by setting data selected by the selection unit 2013 is given, the system 1 may be configured so that the matching table TBL1 in accordance with the instruction.

In this modification example, in a case where a user gives an instruction for changing a print setting indicated by setting data selected by the selection unit 2013 in step S210 of FIG. 9 and the print instructing unit 2014 changes setting data in accordance with the change instruction, the storage instructing unit 2015 instructs the storage device 202 to add a new record, including the feature data indicating features of a print target document which is temporarily stored in the storage device 202 in step S206 and the changed setting data, to the matching table TBL1.

At this time, the storage instructing unit 2015 instructs the storage device 202 to store data, obtained by changing, for example, document type data based on setting data selected by the selection unit 2013 in accordance with a predetermined rule, in a field of [document type] of a new record. For example, in a case where the document type data based on the setting data selected by the selection unit 2013 indicates a type "newspaper" and a use "draft", the storage instructing unit 2015 generates document type data indicating a changed document type like a type "newspaper" and a use "draft (2)" and stores the generated data in the storage device 202.

Meanwhile, the storage instructing unit 2015 may instruct the storage device 202 to overwrite a record of the matching table TBL1 based on the setting data selected by the selection unit 2013 by a new record instead of adding a new record to the matching table TBL1 as described above.

According to this modification example, a user can update the matching table TBL1 by giving an instruction for changing a print setting when necessary at the time of performing printing.

(4) Among print settings of the image forming apparatus 20, the use of specific setting contents may be restricted depending on a user. In this case, when a print setting indicated by setting data selected by the selection unit 2013 includes setting contents that a user is not permitted to use, the printing is not performed. In order to avoid such a problem, the system 1 may be configured such that the selection unit 2013 selects setting data indicating a print setting that a user, having given an instruction for printing a print target document, is permitted to use.

Figure 13:
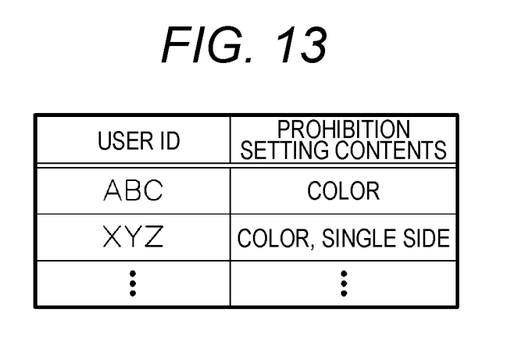
FIG. 13 is a diagram showing contents of a user authority table according to the modification example.

FIG. 13 is a diagram showing contents of a user authority table TBL4 stored in the storage device 202 in this modification example. The user authority table TBL4 is a collection of records based on a user, and includes fields of [user ID] and [prohibited setting contents]. The field of [user ID] stores an ID (Identifier) for identifying a user. The field of [prohibited setting contents] stores data indicating setting contents prohibited from being used by a user. Meanwhile, the user authority table TBL4 may be provided with a field of [permitted setting contents] instead of the field of [prohibited setting contents], and may store data indicating setting contents that a user is permitted to use.

In this modification example, the client device 10 outputs a user ID of a user having given an instruction for printing a print target document on the image forming apparatus 20 in addition to document data and setting data (indicating a default print setting) at the time of giving the instruction for the printing.

The selection unit 2013 determines whether or not a print setting indicated by setting data corresponding to feature data of a template document used for the calculation of similarity includes setting contents indicated by data of a field of [prohibited setting contents] of a record of the user authority table TBL4 based on a user ID which is input from the client device 10, prior to the calculation of similarity which is performed in step S208 of FIG. 9. In a case where a print setting indicated by setting data corresponding to feature data used for the calculation of similarity includes prohibited setting contents for a user, the selection unit 2013 does not calculate similarity using feature data of the template document. Accordingly, the selection unit 2013 does not select a print setting including setting contents that the user is not permitted to use.

(5) In the above-described modification example (4), a print setting including setting contents that are not permitted for a user is not selected. Alternatively, the system 1 may be configured such that when a print setting including setting contents that a user is not authorized to use is selected, the setting contents of the print setting that the user is not authorized to use is changed to alternative setting contents that the user is authorized to use.

Figure 14:
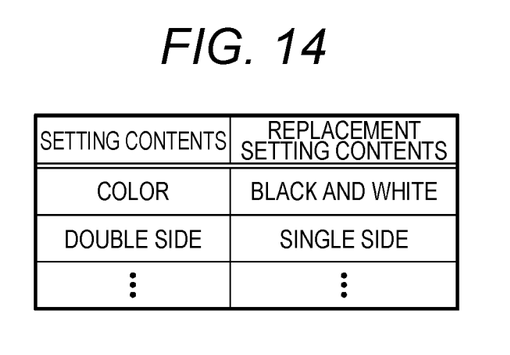
FIG. 14 is a diagram showing contents of an alternative setting content table according to the modification example.

FIG. 14 is a diagram showing contents of an alternative setting content table TBL5 stored in the storage device 202 in this modification example. The alternative setting content table TBL5 is a collection of records corresponding to respective setting contents, and includes fields of [setting contents] and [alternative setting contents]. The field of [alternative setting contents] stores data indicating setting contents alternative to setting contents indicated by data stored in the field of [setting contents]. In addition, in this modification example, the user authority table TBL4 shown in FIG. 13 is also stored in the storage device 202.

In this modification example, the print instructing unit 2014 determines whether or not a print setting indicated by setting data selected by the selection unit 2013 includes setting contents, shown in the user authority table TBL4, that a user who gives an instruction for printing is prohibited to use, before an instruction for printing is given to the printing device 203. In a case where a print setting indicated by selected setting data includes setting contents that the user is prohibited to use, the print instructing unit 2014 retrieves for alternative setting contents to the prohibited setting contents from the alternative setting content table TBL5. In a case where the retrieved alternative setting contents are not setting contents that the user is prohibited to use, the print instructing unit 2014 changes the prohibited setting contents in the print setting indicated by the setting data selected by the selection unit 2013 to the alternative setting contents, and instructs the printing device 203 to print a print target document based on the changed print setting.

Meanwhile, when the print instructing unit 2014 replaces prohibited setting contents with alternative setting contents, for example, setting contents included in a default print setting indicated by setting data which is input from the client device 10 at the time of giving an instruction for printing a print target document may be used as alternative setting contents, instead of alternative setting contents shown in the alternative setting content table TBL5.

(6) In the above-described embodiment, the selection unit 2013 calculates similarity between a template document and a print target document using all of pieces of feature data stored in the matching table TBL1, and selects setting data corresponding to feature data indicating similarity having a maximum value. A method of selecting setting data by the selection unit 2013 is not limited thereto. For example, priorities may be provided in advance in records registered in the matching table TBL1. In a case where the selection unit 2013 calculates similarity using pieces of feature data of records selected in descending order of priority and similarity having a value equal to or greater than a predetermined threshold value is calculated, a configuration may be adopted in which setting data corresponding to feature data used for the calculation of the similarity is selected by the selection unit 2013.

(7) Functions provided by the image forming apparatus 20 according to the above-described embodiment may be provided by being divided into plural devices. For example, the data processing device 201, the storage device 202, and the printing device 203 may be configured as different devices. In addition, one of the devices may be configured as a device different from the other two devices.

(8) In the above-described embodiment, a program executed by the CPU 151 of the client device 10 and a program executed by the CPU 251 of the image forming apparatus 20 may be downloaded through a communication line such as the Internet. In addition, each of the programs may be provided in a state of being recorded in a computer readable recording medium such as a magnetic recording medium (a magnetic tape, a magnetic disk, or the like), an optical recording medium (an optical disc or the like), an optical magnetic recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:
   at least one processor; and
   a memory storing a program causing the processor to execute the program, the program comprising:
      analyzing document data indicating a print target document to specify a feature of contents of the print target document;
      acquiring, from a storage device, feature data indicating a feature of contents of a plurality of documents, which are specified by analyzing the plurality of documents and setting data indicating print settings corresponding to the plurality of documents, the feature data being stored in the storage device in association with a type and a use of the plurality of documents and the setting data;
      comparing the specified feature of the contents of the print target document with the feature indicated by the acquired feature data of the plurality of documents;
      selecting setting data used for printing of the print target document among the acquired setting data based on a comparison result;
      instructing a printing device to print the print target document in accordance with the selected setting data; and
      in a case where a user gives an instruction for changing a print setting indicated by the selected setting data;
         changing the selected setting data in accordance with the instruction for changing, and instructing the printing device to print the print target document in accordance with the changed setting data;
         generating new feature data indicating the specified feature of the contents of the print target document; and
         instructing the storage device to store the generated new feature data which indicates (i) the specified feature of the contents of the print target document, (ii) the changed setting data and (iii) a type and a use of the print target document in association with each other.

2. The data processing device according to claim 1, wherein the program further comprises
   instructing a notification device to give a notice to the user in a case where the print setting indicated by the selected setting data satisfies a predetermined condition.

3. The data processing device according to claim 1, wherein the program further comprises
   instructing a notification device to give a notice to the user in a case where a difference between the print target document, which is printed in accordance with the selected setting data, and the print target document indicated by the document data satisfies a predetermined condition.

4. The data processing device according to claim 1, wherein the program further comprises
   selecting setting data indicating a print setting that is permitted to the user who gives an instruction for printing the print target document among the acquired setting data.

5. The data processing device according to claim 1, wherein, in a case where the print setting indicated by the selected setting data is a print setting that is not permitted to the user who gives an instruction to print the print target document, the selected setting data is changed so as to indicate a print setting that is permitted to the user, and the printing device is instructed to print the print target document in accordance with the changed setting data.

6. A non-transitory computer readable medium storing a program causing a computer to execute data processing comprising:
   analyzing document data indicating a print target document to specify a feature of contents of the print target document;
   acquiring, from a storage device, feature data indicating a feature of contents of a plurality of documents, which are specified by analyzing the plurality of documents and setting data indicating print settings corresponding to the plurality of documents, the feature data being stored in the storage device in association with a type and a use of the plurality of documents and the setting data;
   comparing the specified feature of the contents of the print target document with the feature indicated by the feature data of the plurality of documents which is acquired from the storage device;

selecting setting data used for printing of the print target document among the setting data acquired from the storage device based on a comparison result;

instructing a printing device to print the print target document in accordance with the selected setting data; and in a case where a user gives an instruction for changing a print setting indicated by the selected setting data;

changing the selected setting data in accordance with the instruction for changing, and instructing the printing device to print the print target document in accordance with the changed setting data;

generating new feature data indicating the specified feature of the contents of the print target document; and instructing the storage device to store the generated new feature data which indicates (i) the specified feature of the contents of the print target document, (ii) the changed setting data and (iii) a type and a use of the print target document in association with each other.

* * * * *